United States Patent

Glinski

[11] Patent Number: 5,237,748
[45] Date of Patent: Aug. 24, 1993

[54] METHOD OF MAKING A BEARING ASSEMBLY

[75] Inventor: Paul O. Glinski, Valparaiso, Ind.

[73] Assignee: McGill Manufacturing Company, Inc., Valparaiso, Ind.

[21] Appl. No.: 809,274

[22] Filed: Dec. 16, 1991

[51] Int. Cl.$^5$ .................. F16C 43/00; F16C 33/00
[52] U.S. Cl. .................. 29/898.062; 29/898.063; 29/898.14; 29/530; 29/724; 384/561; 384/584; 384/912
[58] Field of Search .................. 29/898.062, 898.063, 29/898.066, 898.12, 898.14, 527.1, 527.3, 527.5, 530, 724; 384/561, 584, 515, 510, 564, 569, 537, 912

[56] References Cited

U.S. PATENT DOCUMENTS

| | | | |
|---|---|---|---|
| 1,803,966 | 5/1931 | Gibbons | 29/898.062 X |
| 1,985,693 | 12/1934 | Robinson | 29/898.062 X |
| 1,995,838 | 3/1935 | Buckwalter | 29/898.062 X |
| 2,449,943 | 9/1948 | Johnson | 29/898.063 |
| 3,704,498 | 12/1972 | Rundt | 29/898.062 |
| 4,270,815 | 6/1981 | Olschewski et al. | 384/561 |
| 5,001,831 | 3/1991 | Vinciguerra et al. | 29/898.062 |

FOREIGN PATENT DOCUMENTS 43805 5/1938 France .................. 29/898.062

Primary Examiner—Mark Rosenbaum
Assistant Examiner—S. Thomas Hughes
Attorney, Agent, or Firm—Leydig, Voit & Mayer

[57] ABSTRACT

A bearing assembly having concentrically supported inner and outer relatively rotatable races with a pair of endplates secured to the inner race for limiting relative lateral movement between the races. The endplates are secured to the inner race by solidified metal which is applied to the endplates and to the inner bearing race in molten form and which upon solidification secures the endplates in fixed relation to the bearing race. A method of manufacture is disclosed which involves injecting molten zinc between respective annular seating surfaces defined by the endplate and inner bearing race.

6 Claims, 2 Drawing Sheets

METHOD OF MAKING A BEARING ASSEMBLY

The present invention relates generally to bearing assemblies of the type which have an inner race, an outer relatively rotatable race, and endplates secured to one of the races for retaining the other race from axial movement, and more particularly, to an improved bearing assembly of such type and to a method for securing endplates to the bearing race.

BACKGROUND OF THE INVENTION

It has long been the practice to secure endplates to the inner race of a bearing assembly by peening or flaring lips on opposite sides of the inner race into locking relation about the peripheries of the respective endplates. Such metalworking, however, can cause distortion and dimensional size change of the inner race in excess of industry standards. Other methods of securing the endplates to the bearing race have suffered from similar drawbacks. These methods include staking or deforming the inner race at circumferentially spaced locations to secure the endplate, axially deforming a brass band into interposed relation between the endplate and inner race to cause radial expansion and secure retention of the endplate and inner race, and forcing the endplate onto the bearing race with an interference fit. The forces exerted on the inner bearing race in each method can cause distortion of the inner bearing race in excess of acceptable limits.

OBJECTS AND SUMMARY OF THE INVENTION

It is an object of the present invention to provide a bearing assembly in which endplates are reliably secured to one of the bearing races without distortion or appreciable size change of the race.

Another object is to provide an improved method of manufacturing such bearing assembly. A related object is to provide a method of reliably securing endplates to one of the bearing races without exerting significant forces on the bearing race.

Other objects and advantages of the invention will become apparent upon reading the following detailed description and upon reference to the drawings, in which:

Figure 1:
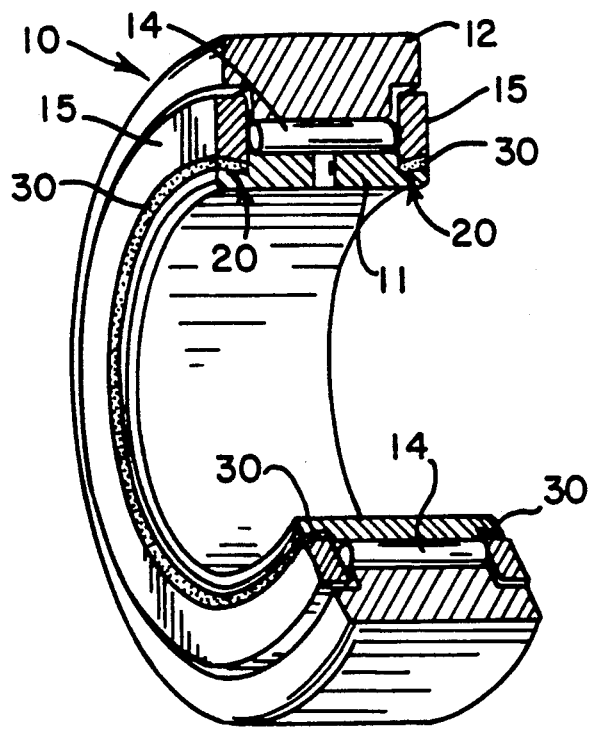
FIG. 1 is a break away perspective of an illustrative bearing assembly embodying the present invention.
Figure 2:
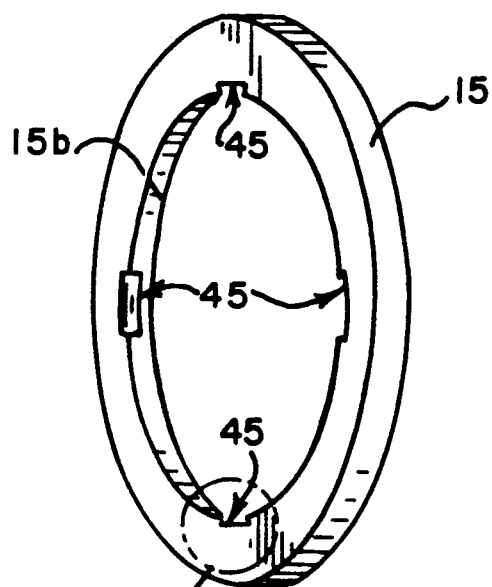
FIG. 2 is a perspective of one of the endplates used in the illustrated bearing assembly.
Figure 3:
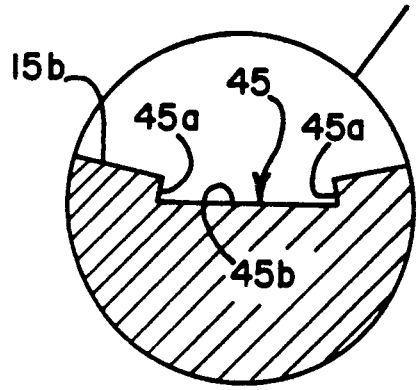
FIG. 3 is an enlarged fragmentary section of the endplate shown in FIG. 2.

While the invention is susceptible of various modifications and alternative constructions, a certain illustrated embodiment thereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention.

DESCRIPTION OF THE PREFERRED EMBODIMENT

Referring now more particularly to the drawings, there is shown an illustrative roller bearing assembly 10 embodying the invention which includes an inner race 11, a relatively rotatable outer race 12, and a plurality of horizontally disposed rollers 14 interposed between the inner and outer races 11, 12. For axially retaining the outer race 12 on the inner race 11, a pair of annular endplates 15 are disposed on opposite ends of the inner race 11. In a track roller installation, the inner race 11 typically is mounted on a non-rotatable shaft or like element and a relatively rotatable member is mounted on the outer race 12. It will be understood that the invention is equally applicable to bearings in which the outer race 12 is secured within a housing or the like for supporting a relatively rotatable shaft mounted within the inner race. In either case, it is important that when securing the endplates to the inner bearing race during manufacture of the bearing assembly that the bearing race is not distorted or deformed in excess of relatively close manufacturing specifications. As indicated above, heretofore bearing race deformation and size change has been a persistent manufacturing problem.

Figure 5:
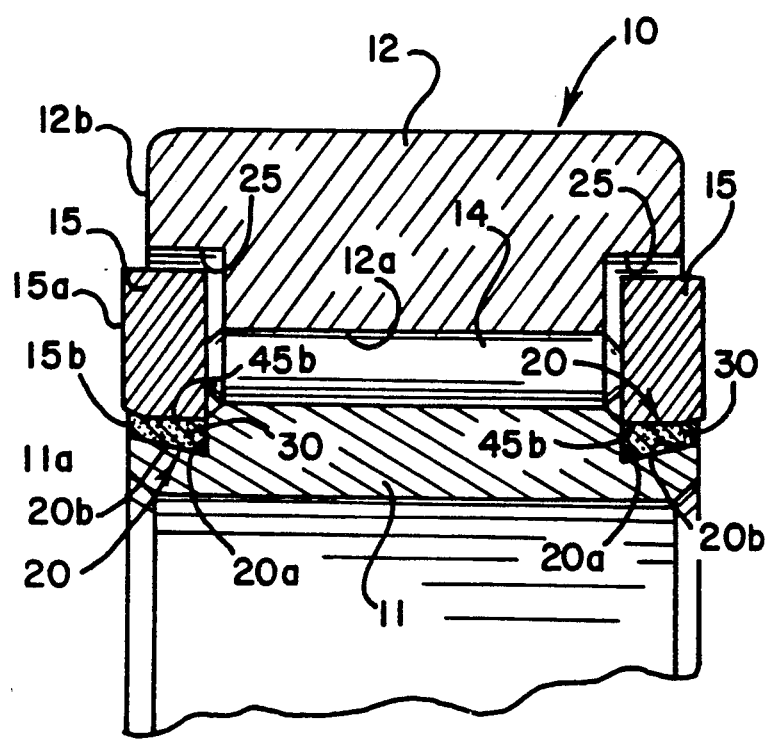
FIG. 5 is an enlarged fragmentary section of the completed bearing assembly.

In accordance with the invention, the endplates are secured to the inner bearing race by metal that is applied in liquid or molten form during manufacture of the bearing assembly without exertion of appreciable distorting forces on the inner race. To this end, in the illustrated embodiment, the inner race 11 is formed with annular, endplate-receiving notches 20 on opposite axial ends thereof (FIG. 5). Each notch 20 has a vertical side 20a spaced inwardly from a respective end face 11a of the inner race 11 a distance corresponding substantially to the width of the endplate 15 such that an exposed side 15a of the endplate 15 is nearly flush with the respective end face 11a of the inner bearing race 11. Each notch 20 defines a conical, endplate seating surface 20b tapered radially inwardly from the end face 11a an acute angle to the horizontal axis of the bearing, such as on the order of 15°. The inner diameter of each annular endplate 15 defines a similarly tapered mounting or seating surface 15b. The endplates 15 each have a radial length sufficient to extend beyond the inner diameter of a cylindrical mounting surface 12a of the outer bearing race 12 in order to define abutments for limiting axial movement of the outer bearing race 12 relative to the inner race 11. The outer bearing race 12 in this instance is formed with annular notches 25 on opposite ends thereof for receiving the endplate 15 such that the exposed sides 15a of the endplates 15 are disposed outwardly of end faces 12b of the outer bearing race 12 only a small distance.

In carrying out the invention, the seating surfaces 15b, 20b of the endplates 15 and inner race 11, respectively, are secured together by metal 30 that is injected between the surfaces in liquid state without appreciable distortion or deformation of the inner bearing race 11. In the illustrated embodiment, the inner and outer races 11, 12 and the endplate 15 to be secured thereto are supported in a fixture 31. The fixture 31 in this case includes an piloting plate 32 which is supported on a pilot shaft 34 and is formed with a cylindrical opening 32a within which the outer periphery of the annular endplate is supported. The pilot shaft 34 has a reduced diameter end 34a extending into the inner diameter of the inner bearing race 11 from one side, which defines a shoulder 34b for engaging one end of the inner bearing race 11. The fixture 31 further includes an arbor assembly 36 comprising an arbor shaft 38 and an adjustable sleeve 39 positionable into the inner diameter of the inner bearing race 11 from the side opposite that of the pilot shaft 34. The sleeve 39 and arbor shaft 38 have cooperating tapered surfaces 40 for facilitating radial adjustment of the sleeve 39, and the sleeve 39 has a radial lip 39a for engaging the side of the inner bearing race 11 opposite that of the pilot shaft 34. Hence, the inner bearing race 11 may be securely held both radially and axially by the arbor assembly 36 and pilot shaft 34 with the seating surfaces 15b, 20b of the inner race 11 and endplate 15 in coaxial spaced relation to each other and with the endplate 15 abutting the side wall 20a of the inner bearing race notch 20, which together define an outwardly opening cavity.

Figure 4:
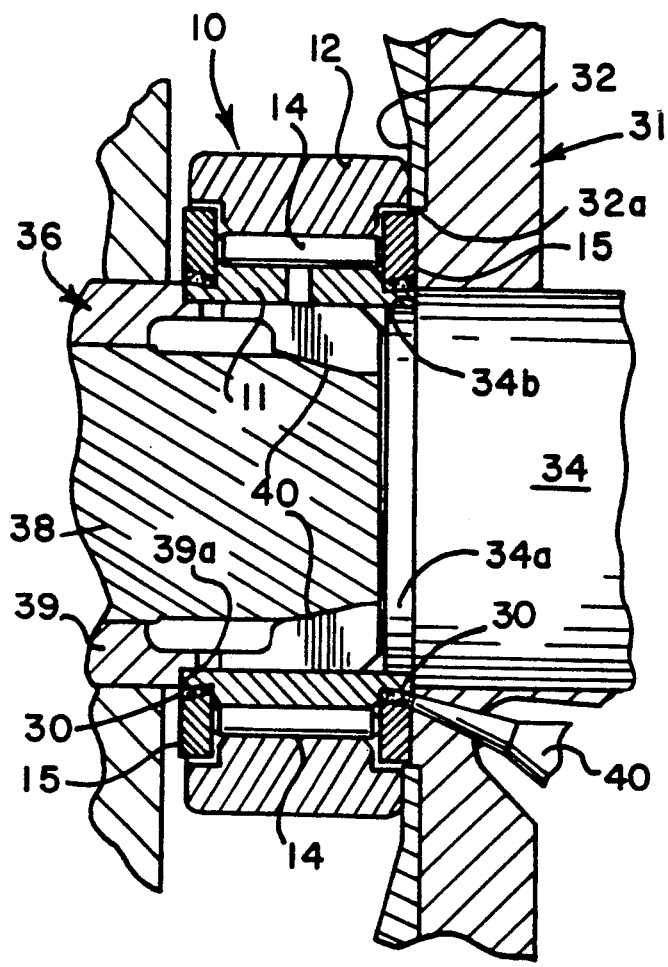
FIG. 4 is a fragmentary section depicting the method of manufacture of the illustrated bearing assembly.

For injecting liquid metal into the cavity defined by the seating surfaces 15b, 20b and the notch side wall 20a, the fixture 31 includes a liquid metal injection nozzle 40 which may be connected to a supply of molten metal, such as zinc, and which is operable in a known manner for forcefully directing the liquid metal into the metal receiving cavity from the lateral opening thereof for completely filling the annular cavity. Upon solidification of the injected molten metal, which occurs in a matter of seconds, the arbor assembly 36 may be rotated by appropriate means to shear the relatively small metal connection at the sprue of the nozzle 40, and then the arbor assembly 36 may be axially withdrawn from the inner race 11 to unclamp the bearing assembly to permit removal from the fixture 31. The bearing assembly may be remounted in the fixture 31 to secure the endplate on the opposite end of the inner bearing race in a similar manner, as shown in FIG. 4. It will be appreciated that during such securement of the endplates 15 to the inner bearing race 11 no appreciable forces are exerted on the bearing races as is typical in prior manufacturing methods. In fact, the nearly instantaneous solidification of the metal results in slight shrinkage of the injected metal.

In further carrying out the invention, for maintaining a reliable connection between the endplates 15 and the inner bearing race 11, notwithstanding slight shrinkage of the injected metal 30 that occurs upon cooling, the endplates 15 are formed with a plurality of circumferentially spaced inwardly opening notches 45 about their inner diameter. Each notch 45 in this instance has a chevron configuration, having outwardly flared sides 45a which define an entry throat that is smaller than an outer side 45b of the notch. The notches 45 preferably are formed on an inboard side of the inner diameter of the end plate 15 so as not to be externally visible. By virtue of such notches, it will be seen that notwithstanding limited shrinkage of the solidified metal 30, outwardly flared tips of the metal 30 in the notches 45 provide positive retention.

From the foregoing, it can be seen that in the bearing assembly of the present invention the endplates are reliably secured to the inner bearing race without exertion of significant forces on the bearing race and without distortion or appreciable size change of the race. The method of securing the endplates also lends itself to relatively economical manufacturing of the bearing assembly.

What is claimed is:

1. A method of making a bearing assembly having an inner race, an outer race concentrically surrounding the inner race for relative rotational movement, and at least one endplate disposed at an end of one of the races, comprising the steps of forming said at least one endplate and one race with respective seating surfaces, concentrically supporting said at least one endplate and one bearing race in coaxial relation to each other with a spacial separation between said seating surfaces, injecting molten metal into the space between said seating surfaces, and allowing said molten metal to solidify to secure said at lease one endplate in fixed relation to said one race.

2. The method of claim 1 wherein said injecting step includes injecting molten zinc to the space between said seating surfaces.

3. The method of claim 1 wherein said forming step includes forming a notch in an end of said one race for defining said bearing race seating surface and a side wall disposed inwardly from an axial end of said one race, said supporting step including concentrically supporting said one bearing race and at least one endplate in coaxial relation with said seating surfaces and notch sidewall defining a laterally opening annular cavity, 4. The method of claim 3 wherein said forming step includes forming said notch in said inner bearing race.

5. A method of making a bearing assembly having an inner race, an outer race concentrically surrounding the inner race for relative rotational movement, and a pair of annular endplates disposed at opposite ends of one of the races for limiting relative lateral movement between the races comprising the steps of loosely assembling said endplates on said one bearing race, applying molten metal between respective surfaces of said endplates and one bearing race, and allowing said molten metal to solidify to secure the endplates in fixed relation to said one bearing race.

6. The method of claim 5 including forming notches in opposite axial ends of said inner bearing race which each define a seating surface and a side wall disposed inwardly from an axial end of said inner bearing race, forming each said annular endplate with a central opening which defines a seating surface, said assembling step including concentrically supporting said inner bearing race and said annular endplates in coaxial relation to each other with said seating surfaces and notch side walls defining laterally opening annular cavities adjacent each end of said inner bearing race, and said applying step including injecting molten metal into said annular cavities.

* * * * *